(12) United States Patent
Worden et al.

(10) Patent No.: US 9,447,745 B2
(45) Date of Patent: Sep. 20, 2016

(54) SYSTEM AND METHOD FOR DIAGNOSING AN ENGINE

(75) Inventors: Bret Dwayne Worden, Lawrence Park, PA (US); Matthew Malone, Lawrence Park, PA (US); Milan Karunaratne, Lawrence Park, PA (US); Paul Lloyd Flynn, Lawrence Park, PA (US)

(73) Assignee: General Electric Company, Schenectady, NY (US)

(*) Notice: Subject to any disclaimer, the term of this patent is extended or adjusted under 35 U.S.C. 154(b) by 1253 days.

(21) Appl. No.: 13/233,574

(22) Filed: Sep. 15, 2011

(65) Prior Publication Data
US 2013/0073174 A1 Mar. 21, 2013

(51) Int. Cl.
| F02D 41/00 | (2006.01) |
| F02D 41/22 | (2006.01) |
| F01M 11/10 | (2006.01) |
| F02D 41/28 | (2006.01) |

(52) U.S. Cl.
CPC .............. *F02D 41/22* (2013.01); *F01M 11/10* (2013.01); *F02D 2041/228* (2013.01); *F02D 2041/288* (2013.01); *F02D 2250/08* (2013.01); *Y02T 10/40* (2013.01)

(58) Field of Classification Search
CPC .............. F02D 41/22; F02D 2250/08; F02D 2041/288; F02D 2041/228; F01M 11/10
USPC .............. 73/114.57, 114.01, 114.16, 114.06; 123/568.11; 701/108, 114, 102, 31.9, 701/32.9
See application file for complete search history.

(56) References Cited

U.S. PATENT DOCUMENTS

| 4,083,234 A | * | 4/1978 | Aono et al. ................. 73/114.04 |
| 4,128,005 A | * | 12/1978 | Arnston et al. ............. 73/114.65 |
| 4,424,709 A | * | 1/1984 | Meier et al. ................ 73/114.25 |
| 5,041,976 A | * | 8/1991 | Marko et al. ................ 701/32.9 |
| 5,179,857 A | * | 1/1993 | Sonderegger et al. ..... 73/114.07 |
| 5,200,899 A | * | 4/1993 | Ribbens et al. .............. 701/111 |
| 5,287,283 A | * | 2/1994 | Musa ............................ 701/114 |
| 5,303,158 A | * | 4/1994 | Kuroda ......................... 701/111 |
| 5,387,253 A | * | 2/1995 | Remboski et al. ......... 73/114.05 |
| 5,402,675 A | * | 4/1995 | Entenmann et al. ...... 73/114.07 |
| 5,487,008 A | * | 1/1996 | Ribbens et al. .............. 701/102 |
| 5,528,930 A | * | 6/1996 | Park ........................... 73/114.06 |
| 5,550,737 A | * | 8/1996 | Tedeschi ..................... 701/33.8 |

(Continued)

FOREIGN PATENT DOCUMENTS

| DE | 10026492 A1 | 11/2001 |
| DE | 102004030908 A1 | 1/2006 |

(Continued)

OTHER PUBLICATIONS

Search Report and Written Opinion from corresponding PCT Application No. PCT/US2012/053517 dated Dec. 20, 2012.

(Continued)

*Primary Examiner* — Hieu T Vo
*Assistant Examiner* — Sherman Manley
(74) *Attorney, Agent, or Firm* — GE Global Patent Operation

(57) ABSTRACT

Methods and systems are provided for an engine including a crankcase. A condition of the engine may be diagnosed based on frequency content of crankcase pressure. Different types of degradation may be distinguished based on a frequency content of multiple frequencies of the crankcase pressure. Thus, a degraded engine component may be identified in a manner that reduces service induced delay.

20 Claims, 5 Drawing Sheets

(56) References Cited

U.S. PATENT DOCUMENTS

| | | | |
|---|---|---|---|
| 5,592,388 A * | 1/1997 | Bradshaw et al. | 701/111 |
| 5,691,469 A * | 11/1997 | Mezger et al. | 73/114.03 |
| 5,792,949 A * | 8/1998 | Hewelt et al. | 73/114.01 |
| 5,978,727 A * | 11/1999 | Jones et al. | 701/101 |
| 6,240,772 B1 * | 6/2001 | Thomas | 73/114.01 |
| 6,338,250 B1 * | 1/2002 | Mackay | 60/612 |
| 6,338,329 B2 * | 1/2002 | Maegawa et al. | 123/339.15 |
| 6,360,541 B2 * | 3/2002 | Waszkiewicz et al. | 60/605.2 |
| 6,408,242 B1 * | 6/2002 | Tozzi | 701/114 |
| 6,575,022 B1 | 6/2003 | Schneider et al. | |
| 6,651,490 B1 * | 11/2003 | Ceccarani et al. | 73/114.74 |
| 6,711,944 B2 * | 3/2004 | Maruta et al. | 73/114.36 |
| 6,779,388 B2 * | 8/2004 | Baeuerle et al. | 73/114.31 |
| 6,837,205 B1 * | 1/2005 | Chipperfield | 123/193.6 |
| 7,721,540 B2 | 5/2010 | Schell et al. | |
| 7,788,020 B2 * | 8/2010 | Wolf et al. | 701/108 |
| 7,954,363 B2 * | 6/2011 | Friis-Knudsen | 73/114.57 |
| 2009/0088949 A1 | 4/2009 | Pache et al. | |
| 2010/0050754 A1 | 3/2010 | Roal et al. | |
| 2011/0011380 A1 | 1/2011 | Lagerlof et al. | |
| 2011/0146391 A1 | 6/2011 | Jach et al. | |
| 2011/0213538 A1* | 9/2011 | Amann | F02D 37/02 701/102 |

FOREIGN PATENT DOCUMENTS

| | | |
|---|---|---|
| EP | 777041 B1 | 3/2002 |
| WO | 2009116897 A1 | 9/2009 |

OTHER PUBLICATIONS

Watsenig, D.; Sommer, M.S.; Steiner, G. "Engine state monitoring and fault diagnosis of large marine diesel engines," e &i Elektrotechnik und Informationstechnik; vol. 126, No. 5, pp. 173-179.

* cited by examiner

SYSTEM AND METHOD FOR DIAGNOSING AN ENGINE

FIELD

Embodiments of the subject matter disclosed herein relate to a system and a method for diagnosing an engine.

BACKGROUND

Engine components may degrade during operation in various ways. For example, the effectiveness of piston rings in sealing the piston in the combustion chamber may degrade causing increased blow-by of combustion gasses into the engine's crankcase.

One approach to detect engine degradation is to monitor a steady-state crankcase pressure. Diagnostic routines can monitor whether the crankcase pressure rises above a threshold pressure, and generate diagnostic codes or other indications requesting service, de-rating engine power, or shutting down the engine.

However, the inventors herein have recognized that an increase in the steady-state crankcase pressure may be caused by a number of different degraded components and it may be time consuming for a maintenance crew to determine the source of the degraded component during service of the engine, and whether the increased piston blow-by is indeed the source of the degradation.

BRIEF DESCRIPTION

In one embodiment, a method for an engine is provided. The method includes diagnosing a condition of the engine based on frequency content of the crankcase pressure.

In one embodiment, a method for an engine is provided. The method includes distinguishing between different types of degradation based on a frequency content of the crankcase pressure.

A degraded engine component may be diagnosed during operation of the engine. For example, it may be possible to distinguish between different types of degradation by considering the frequency content of the crankcase pressure, so that maintenance crews have additional information as to the source of degradation. Further, a particular cylinder that is degraded may be identified from the frequency content of the crankcase pressure during operation of the engine, again providing additional diagnostic and prognostic information to maintenance crews. In this way, service induced delay may be reduced as the source of degradation, and the particular cylinder that is degraded, may be identified prior to service.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or ail disadvantages noted in any part of this disclosure.

BRIEF DESCRIPTION OF THE DRAWINGS

The invention will be understood from reading the following description of non-limiting embodiments, with reference to the attached drawings, wherein below.

DETAILED DESCRIPTION

Embodiments of the subject matter disclosed herein relate to a system and a method for diagnosing an engine. A test kit for performing the method is provided, also. The engine may be included in a vehicle, such as a locomotive system. Other suitable types of vehicles may include on-highway vehicles, off-highway vehicles, mining equipment, and marine vessels. Other embodiments of the invention may be used for stationary engines. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition, These vehicles may include an engine with components that degrade with use. Cylinder components of the engine may degrade, such as piston rings. The degradation may lead to or cause relatively increased blow-by. Where blow-by increases, there may be a corresponding and measurable increase in unburned fuel and/or escaping exhaust gasses from around the piston and into the crankcase.

Figure 1:
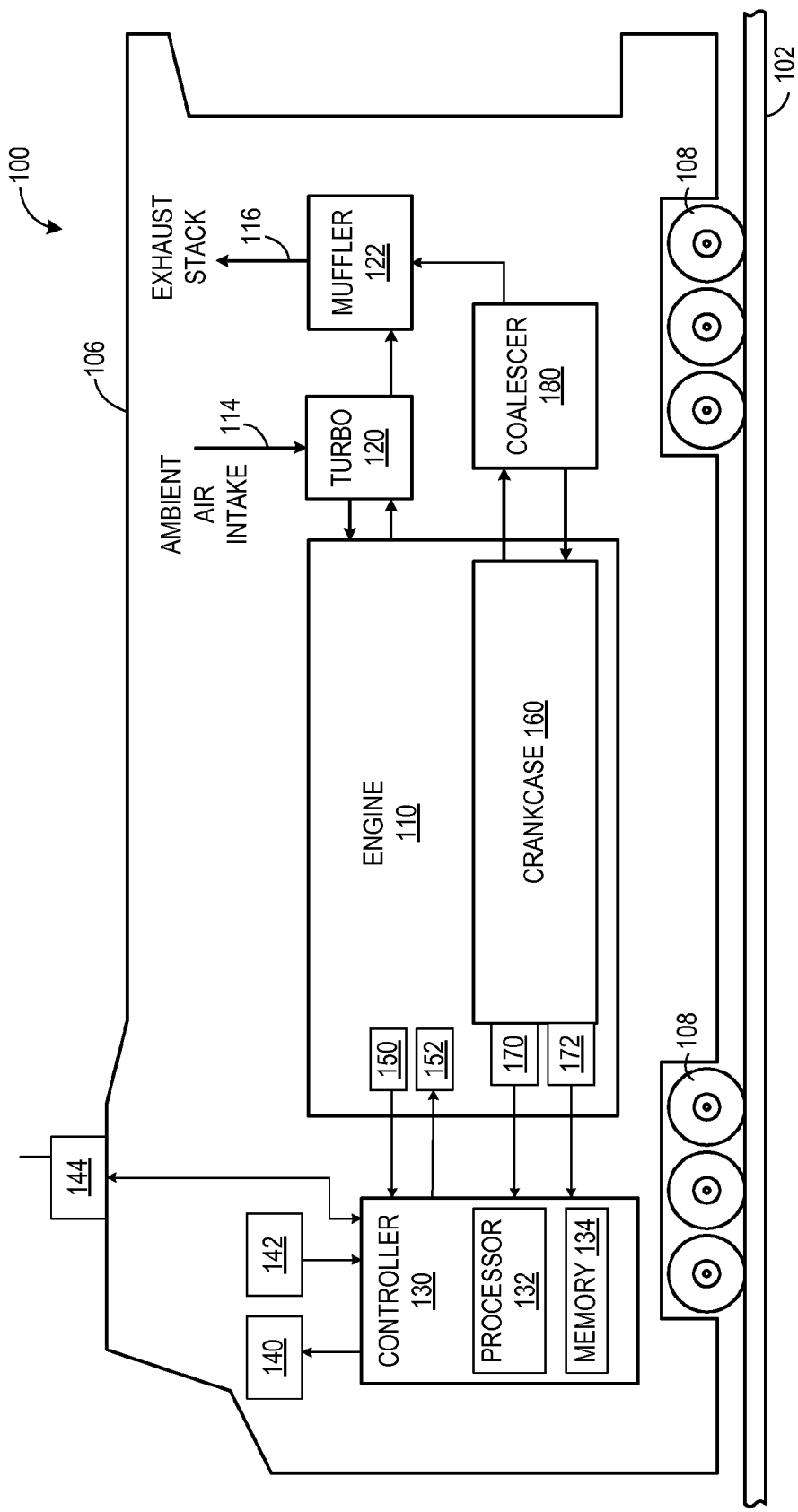
FIG. 1 shows an example embodiment of a vehicle including an engine having a crankcase.

FIG. 1 shows a block diagram of an example embodiment of a vehicle system 100 (e.g., a locomotive system), herein depicted as a rail vehicle 106 configured to run on a rail 102 via a plurality of wheels 108. As depicted, the rail vehicle 106 includes an engine system with an engine 110.

The engine receives intake air for combustion from an intake passage 114. The intake passage 114 receives ambient air from outside of the rail vehicle 106. Exhaust gas resulting from combustion in the engine is supplied to an exhaust passage 116. Exhaust gas flows through the exhaust passage 116, and out of an exhaust stack of the rail vehicle 106.

The engine system includes a turbocharger 120 (TURBO) that is arranged between the intake passage 114 and the exhaust passage 116. The turbocharger 120 increases air charge of ambient air drawn into the intake passage 114 in order to provide greater charge density during combustion to increase power output and/or engine-operating efficiency. In one embodiment, turbocharger 120 may include a compressor (not shown) which is at least partially driven by a turbine (not shown). Turbocharger 120 may include multiple turbine and/or compressor stages.

The engine includes a crankcase 160. Crankcase 160 is an enclosure for a crankshaft (not shown in FIG. 1) connected to cylinders (not shown in FIG. 1) of the engine. The crankshaft may be lubricated by engine oil that is pumped, by an oil pump (not shown) and sprayed onto the crankshaft. Crankcase 160 may include an evacuation system. For example, unburned fuel, air, and exhaust gasses may escape past the cylinders and into the crankcase. The unburned fuel, air, and exhaust gasses, as well as engine oil, may be vented from the evacuation system of crankcase 160 and routed to a coalescer 180. Coalescer 180 may be configured to separate engine oil from the unburned fuel, air, and exhaust gasses and to return the engine oil to crankcase 160. The unburned fuel, air, and exhaust gasses may be routed from coalescer 180 to a muffler 122 arranged between the turbocharger turbine and exhaust passage 116. Muffler 122 may be configured to dampen exhaust noise. In one embodiment, muffler 122 may include an eductor (not shown), The eductor may create suction from crankcase 160 through coalesces 180 and into muffler 122. For example, the eductor may use the Venturi effect to create suction as exhaust gasses flow through muffler 122.

In some embodiments, the vehicle system 100 may further include an exhaust gas treatment system (not shown) coupled in the exhaust passage upstream or downstream of the turbocharger 120. In one example embodiment, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, $NO_x$ trap, or various other devices or systems.

The rail vehicle 106 further includes a controller 130 to control various components related to the vehicle system 100, In one example, controller 130 includes a computer control system. In one embodiment, the computer control system includes a processor, such as processor 132. The controller 130 may include multiple engine control units (ECU) and the control system may be distributed among each of the ECUs. The controller 130 further includes computer readable storage media, such as memory 134, including instructions for enabling on-board monitoring and control of rail vehicle operation. Memory 134 may include volatile and non-volatile memory storage.

The controller may oversee control and management of the vehicle system 100. The controller may receive signals from a variety of engine sensors 150 to determine operating parameters and operating conditions, and correspondingly adjust various engine actuators 152 to control operation of the rail vehicle 106. For example, the controller may receive signals from various engine sensors including engine speed, engine load, boost pressure, exhaust pressure, ambient pressure, exhaust temperature, etc. As another example, the controller may receive a signal from a crankcase pressure sensor 170 that indicates a pressure of crankcase 160. As another example, the controller may receive a signal from a crankshaft position sensor 172 that indicates a position of the crankshaft. Correspondingly, the controller may control the vehicle system by sending commands to various components such as traction motors, alternator, cylinder valves, throttle, etc. Signals from engine sensors 150, 170, and 172 may be bundled together into one or more wiring harnesses to reduce space in vehicle system 100 devoted to wiring and to protect the signal wires from abrasion and vibration.

The controller may include onboard electronic diagnostics for recording operational characteristics of the engine. Operational characteristics may include measurements from sensors 150, 170, and 172, for example. In one embodiment, the operational characteristics may be stored in a database in memory 134. In one embodiment, current operational characteristics may be compared to past operational characteristics to determine trends of engine performance.

The controller may include onboard electronic diagnostics for identifying and recording potential degradation and failures of components of vehicle system 100. For example, when a potentially degraded component is identified, a diagnostic code may be stored in memory 134. In one embodiment, a unique diagnostic code may correspond to each type of degradation that may be identified by the controller. For example, a first diagnostic code may indicate piston ring wear of cylinder 1, a second diagnostic code may indicate piston ring wear of cylinder 2, a third diagnostic code may indicate potential degradation of the crankcase evacuation system, etc.

The controller may be further linked to display 140, such as a diagnostic interface display, providing a user interface to the locomotive operating crew and a maintenance crew. The controller may control the engine, in response to operator input via user input controls 142, by sending a command to correspondingly adjust various engine actuators 152. Non-limiting examples of user input controls 142 may include a throttle control, a braking control, a keyboard, and a power switch. Further, operational characteristics of the engine, such as diagnostic codes corresponding to degraded components, may be reported via display 140 to the operator and/or the maintenance crew.

The vehicle system may include a communications system 144 linked to the controller. In one embodiment, communications system 144 may include a radio and an antenna for transmitting and receiving voice and data messages. For example, data communications may be between vehicle system and a control center of a railroad, another locomotive, a satellite, and/or a wayside device, such as a railroad switch. For example, the controller may estimate geographic coordinates of vehicle system using signals from a GPS receiver. As another example, the controller may transmit operational characteristics of the engine to the control center via a message transmitted from communications system 144. In one embodiment, a message may be transmitted to the command center by communications system 144 when a degraded component of the engine is detected and the vehicle system may he scheduled for maintenance.

Figure 2:
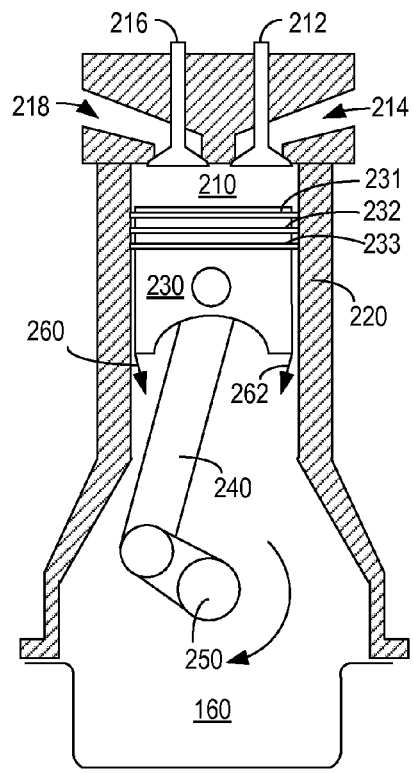
FIG. 2 shows an example embodiment of a cylinder of the engine during the compression stroke.

An example of a degraded component may be a cylinder of the engine. During operation of the engine, the cylinder may degrade and allow unburned fuel and exhaust gasses to escape, or blow-by, from around the piston and into the crankcase. FIG. 2 shows an example embodiment of one cylinder 210 of the engine with blow-by around a piston 230 during a compression stroke. Cylinder 210 includes cylinder wall 220 and a volume for injecting a mixture of fuel and air to be combusted. Piston 230 reciprocates back and forth within cylinder 210 from a top dead center position to a bottom dead center position. The top dead center position corresponds to the position of piston 230 that is closest to an intake valve 212 and an exhaust valve 216. The bottom dead center position corresponds to the position of piston 230 that is farthest from intake valve 212 and exhaust valve 216. In one embodiment, intake valve 212 may be opened to allow a mixture of fuel and air into cylinder 210 from intake passage 214. Exhaust valve 216 may be opened to allow combustion byproducts to exit cylinder 210 through exhaust passage 218. Piston 230 may be coupled to a crankshaft 250 by a connecting rod 240 so that the reciprocating motion of piston 230 may be translated into rotational motion of crankshaft 250. Crankshaft 250 and connecting rod 240 are enclosed within crankcase 160. Piston 230 may include a plurality of grooves where each groove may be configured to hold a piston ring, such as piston rings 231, 232, and 233. Each piston ring 231, 232, and 233 may be configured to fit between piston 230 and cylinder wall 220 for sealing the gap between cylinder wall 220 and piston 230.

In one embodiment, the engine may be a four stroke engine comprising intake, compression, power, and exhaust strokes. During the intake stroke, a mixture of fuel and air may be routed from intake passage 214 into cylinder 210 by opening intake valve 212. In an alternate embodiment, fuel may be directly injected into cylinder 210 by a fuel injector mounted in cylinder 210. Piston 230 generally moves away from top dead center during the intake stroke. During the compression stroke, intake valve 212 may be closed and the mixture of fuel and air in cylinder 210 is compressed by the movement of piston 230 toward top dead center. During the power stroke, the mixture of fuel and air combusts and piston 230 is propelled away from top dead center by the pressure within cylinder 210. In one embodiment, the mixture of fuel and air may self-ignite from compression. In an alternate embodiment, the mixture of fuel and air may be ignited by a spark from a spark plug. During the exhaust stroke, exhaust valve 216 is opened and exhaust gasses may be routed out of cylinder 210 through exhaust passage 218. Piston 230 generally moves toward top dead center during the exhaust stroke. In this manner, the engine, e.g. crankshaft 250, may rotate twice during one four stroke cycle.

In an alternate embodiment, the engine may be a two stroke engine. In a two stroke engine, the intake and exhaust functions partially overlap as the piston approaches bottom dead center at the end of the power stroke and as the piston moves away from bottom dead center at the beginning of the compression stroke, The compression stroke compresses the mixture of fuel and air in the cylinder as the piston moves toward top dead center, During the power stroke, the fuel is ignited and the piston moves away from top dead center. Thus, the engine, e.g. crankshaft 250, may rotate once during one two stroke cycle.

Further, the engine may have a plurality of cylinders that fire in a predefined sequence, where each cylinder fires once during a four stroke or a two stroke cycle. For example, a four cylinder, four stroke engine may have a firing sequence of 1-3-4-2, where each cylinder fires once for every two revolutions of the engine. Thus, the firing frequency of a given cylinder is one half the frequency of revolution of the engine and the firing frequency of any cylinder is twice the frequency of revolution of the engine. The frequency of revolution of the engine, e.g. the frequency of revolution of crankshaft 250, may be described as the first engine order. The firing frequency of a given cylinder of a four stroke engine may be described as the half engine order, where the half engine order is one half the frequency of revolution of crankshaft 250.

As another example of a four stroke engine, a twelve cylinder engine may have a firing sequence of 1-7-5-11-3-9-6-12-2-8-4-10, where each cylinder fires once for every two revolutions of the engine. Thus, the firing frequency of a given cylinder is one half the frequency of revolution of the engine and the firing frequency of any cylinder is six times the frequency of revolution of the engine.

As an example of a two stroke engine, a twelve cylinder engine may have a firing sequence of 1-7-5-11-3-9-6-12-2-8-4-10, where each cylinder fires once for every revolution of the engine. Thus, the firing frequency of a given cylinder is the frequency of revolution of the engine and the firing frequency of any cylinder is twelve times the frequency of revolution of the engine.

Returning to FIG. 2, an example embodiment of one cylinder 210 of a four stroke engine is illustrated during a compression stroke. Blow-by is illustrated by arrows 260 and 262. Blow-by may be caused by the mixture of fuel and air escaping from within cylinder 210, around piston 230, and into crankcase 160. The amount of blow-by may be determined by a condition of the engine and the pressure differential between cylinder 210 and crankcase 160. The condition of the engine may include a condition of one or more of cylinder wail 220, piston 230, and the piston rings 231, 232, and 233.

For example, cylinder wall 220 may degrade as the engine is used. Cylinder wall 220 may become scuffed, gouged, pitted, and/or scraped which may increase the gap between piston 230 and cylinder wall 220 and decrease the resistance to gas flowing from cylinder 210 to crankcase 160, for example. Thus, blow-by may increase in a degraded cylinder. In another example, piston 230 and/or one or more of piston rings 231, 232, and 233 may degrade as the engine is used. The grooves in piston 230 for seating one or more of piston rings 231, 232, and 233 may enlarge, potentially allowing one or more of piston rings 231, 232, and 233 to flutter which may increase blow-by, for example. As another example, one or more of piston rings 231, 232, and 233 may warp, fracture, or be damaged in a manner that may increase blow-by. Thus, blow-by may increase when one or more of cylinder 210 and engine cylinder related components are degraded, where engine cylinder related components may include at least piston 230, piston grooves, and piston rings 231, 232, and 233.

Figure 3:
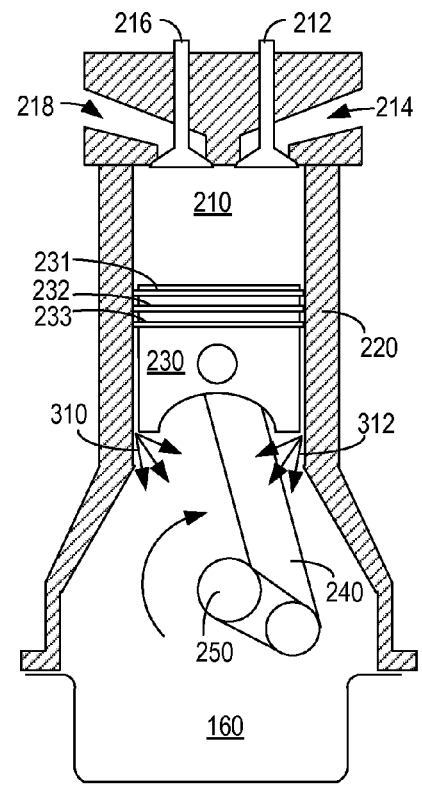
FIG. 3 shows an example embodiment of a cylinder of the engine during the power stroke.

Further, blow-by may be increased as the pressure differential between cylinder 210 and crankcase 160 increases. As one example, the peak pressure differential during the compression stroke may be less than the peak pressure differential during the power stroke. During the compression stroke, the pressure in cylinder 210 may be determined by the pressure of the mixture of air and fuel entering cylinder 210 and the reduction in volume of cylinder 210 during compression. During the power stroke, the compressed mixture of air and fuel is ignited, further increasing the pressure in cylinder 210. FIG. 3 illustrates an example embodiment of cylinder 210 of the engine with blow-by during the power stroke. Blow-by during the power stroke may be greater than blow-by during the compression stroke. The increased blow-by during the power stroke is illustrated by arrows 310 and 312.

Figure 4:
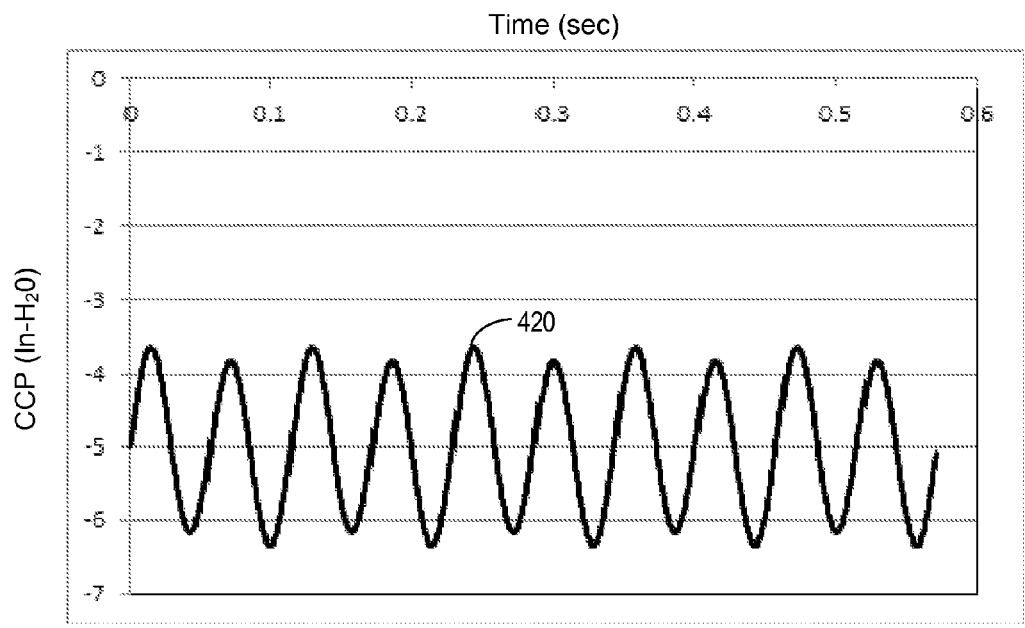
FIG. 4 shows data of a time-domain crankcase pressure signal.

Blow-by may be an engine condition that affects the pressure of crankcase 160. Other examples of engine conditions that may affect the pressure of crankcase 160 include one or more of engine speed, engine load, crankcase temperature, crankcase evacuation flow, and a condition of turbocharger 120. As illustrated by the data of FIG. 4, crankcase pressure (CCP) 420 may vary over time. In one embodiment, crankcase pressure 420 may be a partial vacuum. For example, the data of FIG. 4 illustrates crankcase pressure 420 may vary in a range of from about negative 6.5 to about negative 3.5 inches of water (In-$H_2O$) for a near constant engine speed around 1050 revolutions per minute (RPM), e.g. 17.5 Hz, Gasses blowing by piston 230 may be at a different pressure than crankcase pressure 420 and so they may contribute to transient fluctuation of crankcase pressure 420. For example, exhaust gasses blowing by piston 230 during the power stroke may be at higher pressure than crankcase pressure 420 and so the exhaust gasses may cause a transient increase in crankcase pressure 420. Further, the exhaust gasses blowing by piston 230 during the power stroke may be at a higher pressure than unburned fuel and air blowing by piston 230 during the compression stroke. Thus, blow-by during the power stroke may cause a greater increase in crankcase pressure than blow-by during the compression stroke. In other words, crankcase pressure 420 may include a frequency component at the power stroke frequency. For a four stroke engine, the power stroke frequency component is at one half the frequency of revolution of the engine. For a two stroke engine, the power stroke frequency component is at the frequency of revolution of the engine.

Crankcase pressure 420 may be reduced by venting unburned fuel, air, and exhaust gasses from the evacuation system of crankcase 160 to coalescer 180. In one embodiment, venting may be increased with suction from an eductor of muffler 122. The eductor may use the Venturi effect to create suction as exhaust gasses flow through muffler 122 and so the suction may vary with the flow of exhaust gas through muffler 122. Crankcase pressure 420 may oscillate around an average crankcase pressure for a given engine speed, as illustrated in the data of FIG. 4. For example, the average crankcase pressure of FIG. 4 is about negative 5.0 In-$H_2O$. FIG. 4 illustrates an example graph of time-domain crankcase pressure data. The time-domain crankcase pressure data may be sampled and transformed into a frequency domain pressure signal.

One solution for diagnosing a condition of an engine is to monitor the average, or steady-state, crankcase pressure. For example, a potential engine failure condition may be detected if the average crankcase pressure exceeds an absolute pressure threshold. However, an increase in the average crankcase pressure may be caused by a number of different degraded components and it may be time consuming for the maintenance crew to determine the source of the degraded component during service of the engine.

A condition of the engine may be diagnosed based on frequency content of crankcase pressure. A suitable example of a frequency content of crankcase pressure can be obtained as follows: the crankcase pressure may be measured to generate a time-domain crankcase pressure signal; and, the time-domain crankcase pressure signal may be sampled and transformed to generate a frequency domain crankcase pressure signal. The frequency domain crankcase pressure signal may include a set of frequency components at different frequencies and magnitudes. The frequency content of the crankcase pressure is the relative magnitudes of frequency components of the frequency domain crankcase pressure signal and/or is the measured frequency content as created with a band-pass filter. Pressure measurements may be performed with a suitable pressure sensor, such as crankcase pressure sensor 170. A discrete Fourier transform, such as a fast Fourier transform, may be used to generate the frequency domain crankcase pressure signal. Further, the condition of the engine may be diagnosed based on the frequency content of the crankcase pressure.

Figure 5:
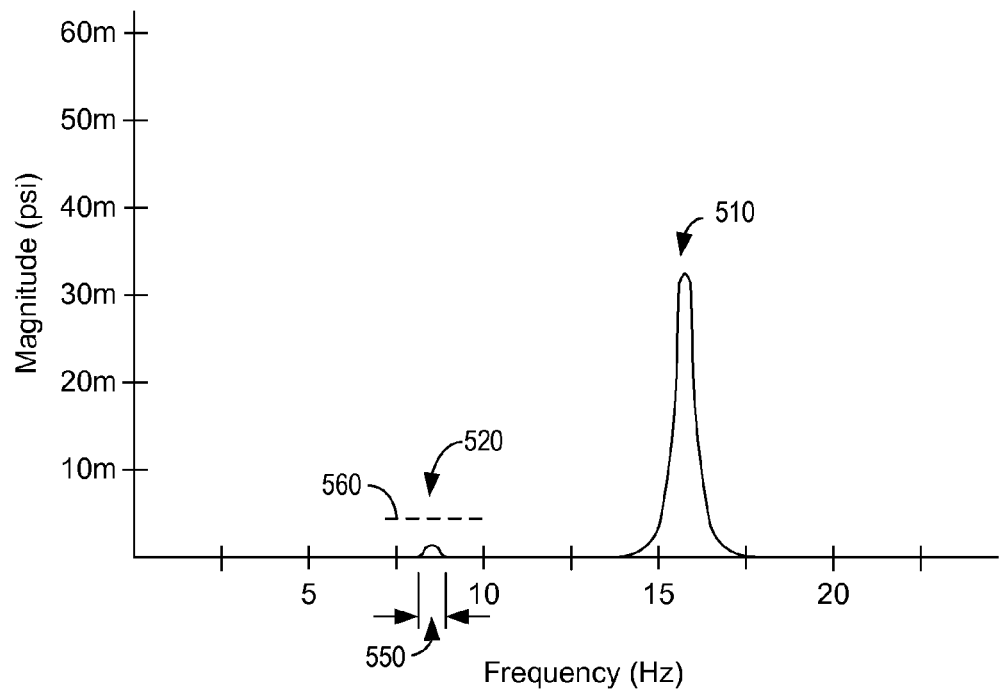
FIGS. 5 and 6 each show data of a frequency-domain crankcase pressure signal.

FIG. 5 shows data of a frequency-domain crankcase pressure signal of an engine that may be operating with a healthy crankcase pressure. For example, the engine may be a four stroke engine operating at 1050 RPM. Thus, the first engine order is at 17.5 Hz and the half engine order is at 8.75 Hz. The crankcase pressure may vary with a periodic frequency as crankshaft 250 revolves within crankcase 160. For example, the frequency content of the crankcase pressure may include a peak pressure 510 at the frequency of the first engine order. In other words, the peak magnitude of the frequency content may occur at the first-order frequency component. The first order frequency component may be attributed to local piston movement in the cylinder. For example, in one crankshaft revolution the piston travels from top dead center to bottom dead center and back up to top dead center. Thus, the motion of the piston may cause a pressure wave inside the crankcase at the crankshaft revolution frequency. The first order frequency component may be dominant in the crankcase pressure signal due to the piston dynamics local to the sensor.

The crankcase pressure may also include frequency content at other harmonics of the first-order frequency, such as at a second-order frequency (twice the engine frequency), a third-order frequency (three times the engine frequency), etc. Similarly, the crankcase pressure may include frequency content at frequencies less than the first-order frequency, such as at a half-order frequency (half the engine frequency). FIG. 5 illustrates an example of a half-order component 520, and shows a data graph of a frequency-domain crankcase pressure signal of an engine that may be operating with a healthy crankcase pressure. The graph illustrates pressure magnitudes at discrete frequencies.

A healthy engine may include an average crankcase pressure below a threshold pressure. Further, a healthy engine may include frequency content substantially around the half-order frequency, such as the range of frequencies 550, for example. In one embodiment, the range of frequencies 550 may be plus or minus ten percent of the half-order frequency, depending on engine speed. Frequency content near the half-order frequency may be caused by at least a healthy amount of blow-by from piston 230. In a healthy engine, the frequency content may include frequency components substantially near the half-order frequency with magnitudes less than a threshold value, such as threshold value 560. An engine may be degraded when one or more components of the engine have degraded. The degraded components may cause the engine to operate less efficiently, with less power, and/or with more pollution, for example. Further, the condition of the degraded components may accelerate degradation of the components which may increase the likelihood of catastrophic engine failure and road failure.

A degraded cylinder is an example of degraded engine component. Blow-by may be increased for a degraded cylinder compared to a healthy cylinder. Increased blow-by may cause a transient pressure spike as the high pressure gasses from cylinder 210 escape into crankcase 160. The transient pressure spike may occur at the frequency that the degraded cylinder is firing. Thus, for a four-stroke engine, the transient pressure spike may occur at the half-order frequency. For a two-stroke engine, the transient pressure spike may occur at the first-order frequency. Thus, it may be desirable to identify the frequency content of the crankcase pressure substantially near half-order frequency 520, such as the range of frequencies 550, for example.

Figure 6:
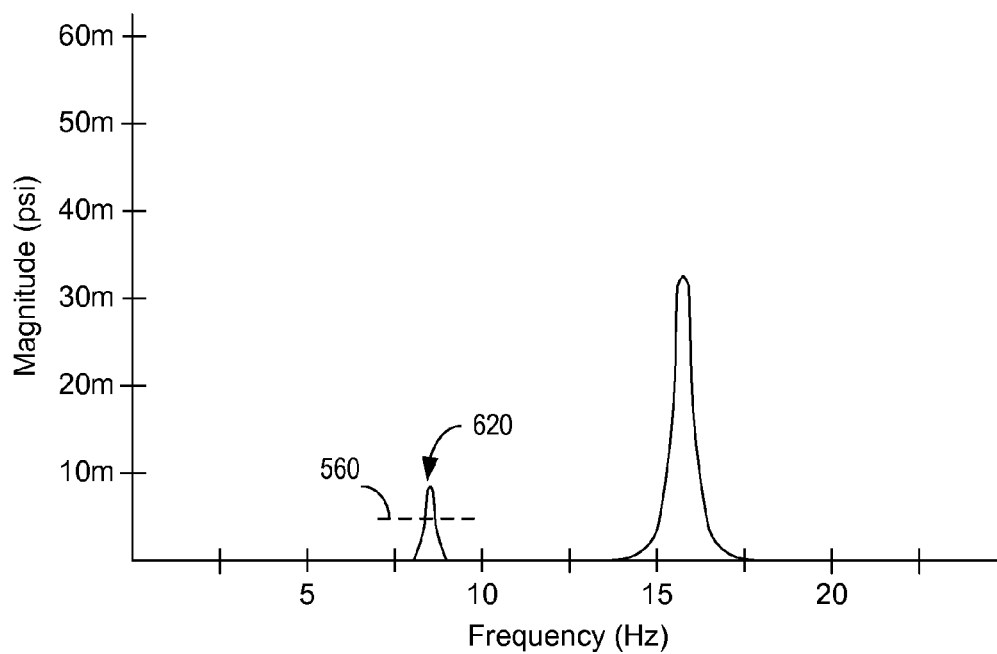

Frequency content near the half-order frequency may be caused by different amounts of blow-by escaping from each of the cylinders of a multi-cylinder engine, for example. The differences may be caused by differing wear patterns or manufacturing differences of each cylinder, for example. Thus, the frequency content of a healthy engine may include frequency components substantially near the half-order frequency with magnitudes less than a threshold value, such as threshold value 560. However, a degraded cylinder may have increased blow-by, and the frequency content of a four stroke engine with the degraded cylinder may include frequency components substantially near the half-order frequency with magnitudes greater than threshold value 560. For example, FIG. 6 illustrates data that may indicate a degraded cylinder, where half-order component 620 exceeds threshold value 560, and the data shows a frequency-domain crankcase pressure signal of an engine that may be operating with a crankcase pressure that indicates a particular type of cylinder degradation. For example, the engine of FIG. 6 may have a degraded component causing blow-by, such as worn piston rings. The diagnosis, then, may include both a warning of degradation as well as an indication of the type and/or location of the degraded engine component.

Thus, in one embodiment, a degraded cylinder of a four stroke engine may be detected based on a frequency content signature, such as the magnitude of the half-order frequency component being greater than a half-order threshold value. In an alternate embodiment, the magnitudes of the frequency content may be integrated over the range of frequencies 550, and a degraded cylinder of a four stroke engine may be detected based on the integration being greater than an integral threshold value.

Detection of one degraded cylinder, where the other cylinders of the engine are more healthy (or less degraded), may have a more clear frequency content signature than when multiple cylinders of the engine are degraded. For example, the frequency content signature of one degraded cylinder may be identified by comparing the magnitude of the half-order frequency component to a half-order magnitude threshold value. However, multiple degraded cylinders may have a different frequency component signature than a single degraded cylinder. Further, the position in the firing order of multiple degraded cylinders may change the frequency content signature. For example, two degraded cylinders 180° out of phase may have a different frequency component signature than two degraded cylinders in successive firing order, and thus the methods disclosed herein may identify one or more degraded cylinders based on various changes in the frequency content signature. Further, it may be beneficial to generate a frequency content signature of a healthy engine by recording frequency content at various frequencies and operating conditions. In one embodiment, the frequency content of the engine may be compared to the frequency content signature of a healthy engine. Anomalies not matching the frequency content signature of the healthy engine or a different degraded engine component may be identified and reported by the controller, for example.

Another example of a degraded engine component is a degraded crankcase evacuation system. For example, the degraded crankcase evacuation system may not vent gasses from crankcase 160 at a high enough rate which may cause the average or peak crankcase pressure to exceed an average crankcase pressure threshold value. The degraded crankcase evacuation system may affect all cylinders of a multi-cylinder engine in a similar way and so the half-order frequency components may not be largely affected by the degraded crankcase evacuation system. In one embodiment, a potentially degraded crankcase evacuation system may be diagnosed by identifying the average crankcase pressure exceeds the average crankcase pressure threshold value and frequency content of the crankcase pressure includes a half-order frequency component that is less than a half-order threshold value. Each of the average crankcase pressure and half-order threshold values may be based on one or more of engine speed, engine load, crankcase temperature, and historical engine data, for example.

Another example of a degraded engine component is a degraded turbocharger, such as turbocharger 120. In one embodiment, turbocharger 120 may include a seal that is lubricated by engine oil that drains into crankcase 160. A degraded seal of the turbocharger may provide a path for high pressure boosted air and/or exhaust gas to enter crankcase 160 from turbocharger 120, for example. The degraded turbocharger may affect all cylinders of a multi-cylinder engine in a similar way and so the half-order frequency components may not be largely affected by the degraded turbocharger. In one embodiment, a potentially degraded turbocharger may be diagnosed by identifying an average crankcase pressure exceeding an average crankcase pressure threshold value and frequency content of the crankcase pressure including a half-order frequency component that is less than a half-order threshold value.

Another example of a degraded engine component is a degraded crankcase. For example, a healthy engine may include a crankcase that is a substantially closed system. When the crankcase is substantially closed, the motion of the piston may cause a pressure wave inside the crankcase at the crankshaft revolution frequency, e.g. at the first order frequency. However, a degraded crankcase may include a crankcase door that has been blown open during operation or a crankcase door that has been improperly replaced or sealed during routine maintenance, etc. When the crankcase is degraded, the crankcase may be open to the atmosphere raising the average crankcase pressure and affecting the dynamics of the pressure wave inside the crankcase at the crankshaft revolution frequency. As one example, the average crankcase pressure may rise to within 0.5 In-$H_2O$ of atmospheric pressure and the first order frequency response of the crankcase pressure signal may be significantly decreased when the crankcase is degraded. The degraded crankcase may affect all cylinders of a multi-cylinder engine in a similar way and so the half-order frequency components may not be largely affected by the degraded crankcase. Thus, in one embodiment, a potentially degraded crankcase may be diagnosed by identifying an average crankcase pressure exceeding an average crankcase pressure threshold value and frequency content of the crankcase pressure including a first-order frequency component that is less than a first-order threshold value. In another embodiment, a potentially degraded crankcase may be diagnosed by identifying an average crankcase pressure exceeding an average crankcase pressure threshold value and frequency content of the crankcase pressure including a first-order frequency component that is less than a first-order threshold value and a half-order frequency component that is less than a first-order threshold value.

The above examples illustrate various approaches for distinguishing between different types of engine degradation based on the frequency content of the crankcase pressure during engine operation.

Figure 7:
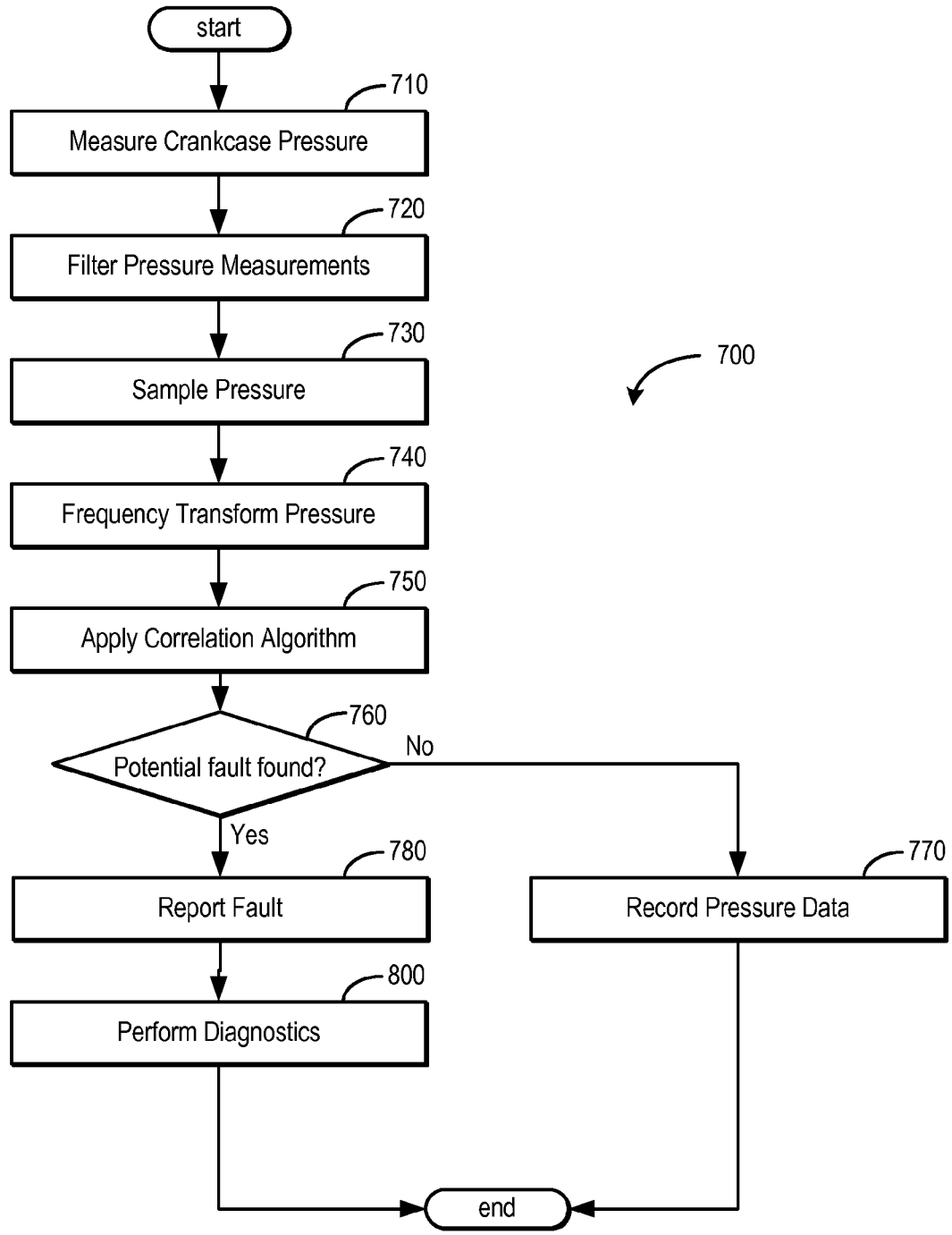
FIGS. 7 and 8 each show an example embodiment of a method for diagnosing a condition of the engine.

The crankcase pressure may be monitored during operation of the engine, such as illustrated with an example embodiment of a method in FIG. 7. FIG. 7 illustrates an example embodiment of a method 700 for diagnosing a condition of the engine. In one example, method 700 may comprise diagnosing a condition of the engine based on frequency content of crankcase pressure. In another example, method 700 may comprise distinguishing between different types of degradation based on a frequency content of multiple frequencies of the crankcase pressure.

For example, considering both the frequency content and steady-state crankcase pressure may provide information that distinguishes between degradation of a particular cylinder, versus normal wear evenly distributed among all of the engine cylinders. In this example, an increased steady-state pressure value above a steady-state threshold value value, but with the magnitude of the frequency content of the crankcase pressure substantially near half-order frequency 520 being below the threshold value 560, may indicate overall wear of all of the cylinders, whereas an increased steady-state pressure value above the steady-state threshold value, but with the magnitude of the frequency content of the crankcase pressure substantially near half-order frequency 520 being above the threshold value 560, may indicate that one of the cylinders has increased degradation relative to the other cylinders of the engine.

As another example, the frequency content and steady-state crankcase pressure may provide information that distinguishes between increased blow-by of a particular cylinder and a degraded venting rate of the crankcase evacuation system. In this example, an increased steady-state pressure value above an evacuation steady-state threshold value, but with the magnitude of the frequency content of the crankcase pressure substantially near half-order frequency 520 being below the threshold value 560, may indicate degradation of the crankcase evacuation system, whereas an increased steady-state pressure value above the evacuation steady-state threshold value, but with the magnitude of the frequency content of the crankcase pressure substantially near half-order frequency 520 being above the threshold value 560, may indicate that one of the cylinders has increased degradation relative to the other cylinders of the engine.

At 710, crankcase pressure may be measured. For example, the pressure of crankcase 160 may be measured with a sensor, such as crankcase pressure sensor 170, to generate a time-domain crankcase pressure signal.

At 720, the crankcase pressure may be filtered. In one embodiment, the time-domain crankcase pressure signal may be filtered by a low-pass filter with a cut-off frequency slightly-greater than the first-order frequency. For example, the cut-off frequency may be ten to twenty percent greater than the first-order frequency. Thus, in one embodiment, the cut-off frequency may be determined by the engine speed.

At 730, the crankcase pressure may be sampled. For example, the crankcase pressure may be sampled at a frequency greater than or equal to the Nyquist rate. In one embodiment, the time-domain crankcase pressure signal may be sampled at a frequency greater than twice the first engine order frequency. In one embodiment, the time-domain crankcase pressure signal may be sampled at a frequency greater than twice the engine red-line frequency. Thus, by low-pass filtering and sampling at a frequency greater than or equal to the Nyquist rate, the frequency content of the crankcase pressure may not be aliased.

At 740, the sampled crankcase pressure may be transformed. For example, the sampled crankcase pressure may be transformed to generate a frequency domain crankcase pressure signal. In one embodiment, a fast Fourier transform may be used to generate the frequency domain crankcase pressure signal.

At 750, a correlation algorithm may be applied. In one embodiment, a correlation algorithm may be applied to compare the frequency domain crankcase pressure signal, e.g. the frequency content of the crankcase pressure, to a signature for a condition of the engine. For example, the signature for a healthy engine may include frequency content at the first-order frequency with a magnitude below a first-order threshold value and frequency content at the half-order frequency with a magnitude below a half-order threshold value. The first-order threshold value may correspond to engine speed, engine load, crankcase temperature, and historical engine data.

For example, the historical engine data may be stored in a database including samples of frequency content from earlier operation of the engine. Thus, a trend in frequency content may be detected and the trend may be used to determine the health of the engine. For example, an increasing magnitude at the half engine order component for a given engine speed and load may indicate that a cylinder is degrading. As another example, an increasing average crankcase pressure coupled without an increasing magnitude at the half engine order component for a given engine speed and load may indicate that the turbocharger or crankcase evacuation system is degrading.

At 760, it is determined if a potential fault has been found. For example, potential faults may include a degraded cylinder, a degraded turbocharger, or a degraded crankcase evacuation system. In one embodiment, the potential fault may be found by applying the correlation algorithm of 750. If a potential fault is found, method 700 continues at 780, and the diagnosis of the engine may continue. If a potential fault is not found, method 700 continues at 770.

At 770, crankcase pressure data may be recorded. In one embodiment, frequency content of the crankcase pressure data may be stored in a database including historical engine data. For example, the database may be stored in memory 134 of controller 130. As another example, the database may be stored at a site remote from rail vehicle 106. For example, historical engine data may be encapsulated in a message and transmitted with communications system 144. In this manner, a command center may monitor the health of the engine in real-time, For example, the command center may perform steps, such as steps 740, 750, 760, 770, and 780, to diagnose the condition of the engine using the engine data transmitted with communications system 144. For example, the command center may receive engine data including crankcase pressure data from rail vehicle 106, frequency transform the crankcase pressure data, apply a correlation algorithm to the transformed data, and diagnose potential degradation of the engine. Further, the command center may schedule maintenance and deploy healthy locomotives and maintenance crews in a manner to optimize capital investment. Historical engine data may be further used to evaluate the health of the engine before and after engine service, engine modifications, and engine component change-outs. Method 700 may end after 770.

At 780, a potential fault may be reported. In one embodiment, a potential fault may be reported to the locomotive operating crew via display 140. Once notified, the operator may adjust operation of rail vehicle 106 to reduce the potential of further degradation of the engine. In one embodiment, a message indicating a potential fault may be transmitted with communications system 144 to a command center. Further, the severity of the potential fault may be reported. For example, diagnosing a fault based on frequency content of the crankcase pressure may allow a fault to be detected earlier than when the fault is diagnosed with only average crankcase pressure. Thus, the engine may continue to operate when a potential fault is diagnosed in the early stages of degradation. In contrast, it may be desirable to stop the engine or schedule prompt maintenance if a potential fault is diagnosed as severe. In one embodiment, the severity of a potential fault may be determined according to a difference between a threshold value and the magnitude of one or more components of the frequency content of the crankcase pressure.

Figure 8:
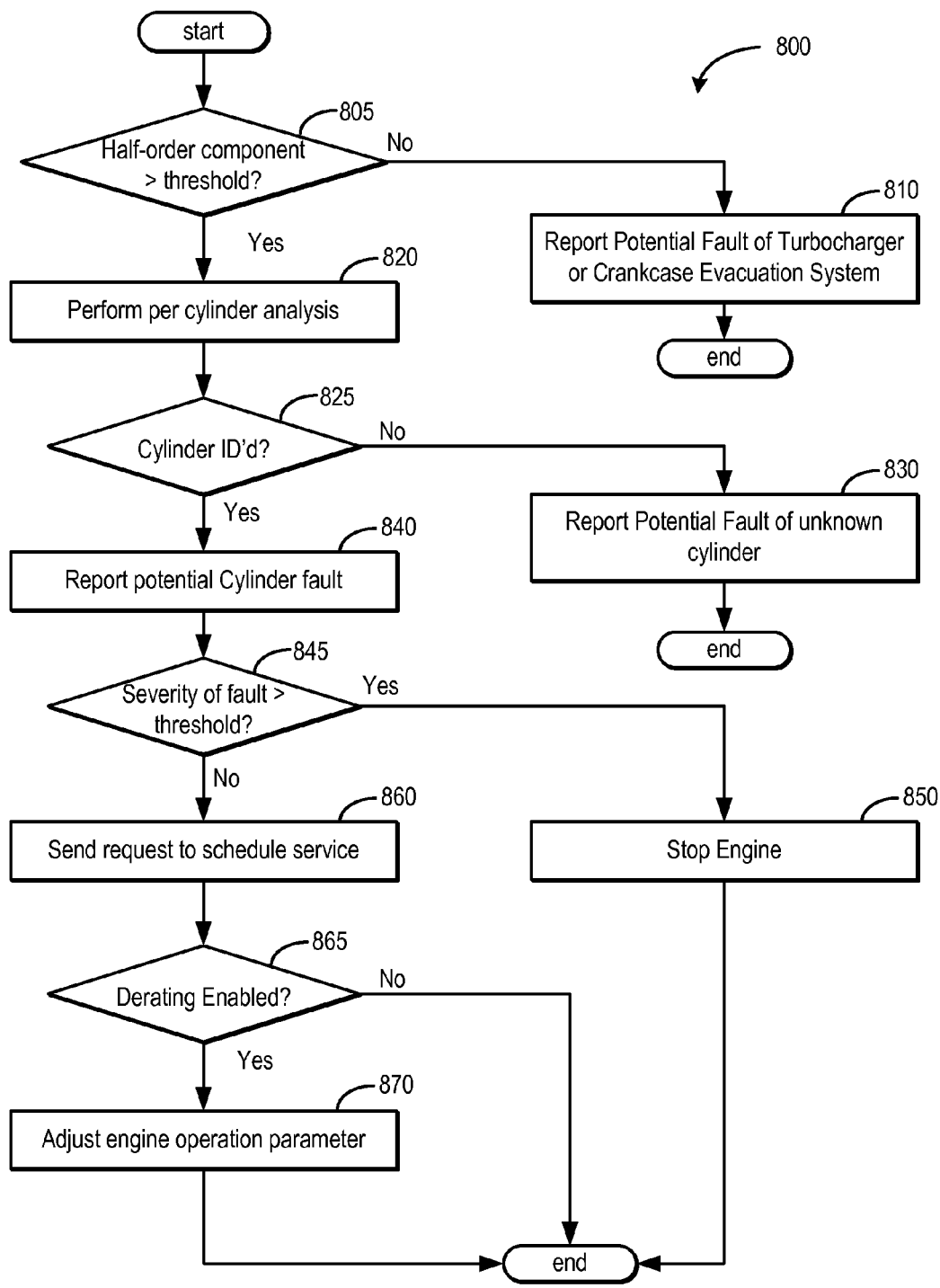

If the crankcase pressure indicates a potential faulty component of the engine, further diagnostics may be performed as illustrated with an example embodiment of a method in FIG. 8. Thus, by analyzing the frequency content of the crankcase pressure, it may be possible to monitor and diagnose the engine during operation. Further, operation of an engine with a degraded component may be adjusted to potentially reduce additional degradation of the engine component and to potentially reduce the likelihood of additional engine failure and in-use failure. At 800, and as further elaborated in FIG. 8, the potential fault may be further diagnosed. FIG. 8 illustrates an example embodiment of a method 800 for diagnosing a condition of the engine, At 805, the half-order component may be compared to a half-order threshold value, In one embodiment, if the magnitude of the half-order component is greater than the half-order threshold value, the potential fault may be a degraded cylinder and method 800 continues at 820 where the degraded cylinder may be identified. However, if the magnitude of the half-order component is not greater than the half-order threshold value, the potential fault may be a degraded turbocharger 120 or a degraded crankcase evacuation system and method 800 continues at 810.

At 810, the potential fault may be reported as a degraded turbocharger 120 or a degraded crankcase evacuation system. In one embodiment, the potential fault may be reported to the locomotive operating crew via display 140 and the operator may adjust operation of rail vehicle 106 to reduce the potential of further degradation. In one embodiment, a message diagnosing the potential fault as a degraded turbocharger 120 or a degraded crankcase evacuation system may be transmitted with communications system 144 to a command center. Method 800 may end after 810.

At 820, a per cylinder diagnosis may be performed so the degraded cylinder may be identified. In one embodiment, time-domain measurements may be used to identify the degraded cylinder. For example, the crankcase pressure may peak periodically, and the peak may be correlated with one or more of a crankshaft position, a camshaft position, and a fuel injection sequence. Thus, in one embodiment, the degraded cylinder may be identified by correlating time-domain crankcase pressure information to one or more of a crankshaft position, camshaft position, and a fuel injection sequence. As another example, the degraded cylinder may be identified by correlating time-domain crankcase pressure information to engine firing order. Further, a correlation algorithm may compensate for pressure wave transport lag between the degraded cylinder and the pressure sensor.

Blow-by from a degraded cylinder may affect other engine operating conditions. For example, the crankcase temperature may peak during the power stroke of the degraded cylinder. Similarly, the temperature and pressure of evacuated gasses from the crankcase evacuation system may peak or pulse in a manner that may be correlated to the degraded cylinder.

In one embodiment, an engine operating parameter may be adjusted to identify a degraded cylinder. For example, the degraded cylinder may be identified based on selective disabling of fuel injection to one or more cylinders of the engine. In one embodiment, fuel injection may be disabled for each cylinder of the plurality of cylinders in a sequence while one or more of the average crankcase pressure and frequency content of the crankcase pressure are monitored, For example, fuel injection to one cylinder may be disabled while the other cylinders operate normally. By disabling each cylinder in a sequence, the degraded cylinder may be identified. As another example, fuel injection to a group of cylinders may be disabled while the other cylinders operate normally. By cycling through different groups in a sequence, the degraded cylinder may be identified through a process of elimination.

In one example, the half-order frequency component of the crankcase pressure may be monitored for each disabled cylinder of a four stroke engine. The disabled cylinder may be a degraded cylinder when the half-order frequency component drops below a half-order threshold value while the cylinder is disabled. The disabled cylinder may be a healthy cylinder when the half-order frequency component remains above the half-order threshold value while the cylinder is disabled. In other words, the degraded cylinder may be the cylinder that contributes a higher amount of frequency content at the half-order frequency component than other cylinders. In one embodiment, the selective disabling diagnosis may be performed when the engine is operating at idle or lightly loaded.

Similarly, the average crankcase pressure may be monitored while selectively disabling fuel injection to one or more cylinders of the engine. For example, the average crankcase pressure may drop disproportionately when the degraded cylinder is disabled.

In one embodiment, the selective disabling diagnosis may be further based on frequency content of other engine operating parameters, such as a crankcase evacuation flow, a crankcase evacuation temperature, or a crankcase temperature. For example, the crankcase evacuation flow may include frequency content at the half-order frequency component when a degraded cylinder is operating. Thus, observing frequency content of various engine operating parameters while selectively disabling each cylinder may identify the degraded cylinder.

In one embodiment, the degraded cylinder may be identified based on selectively varying fuel injection to one or more cylinders of the engine. For example, fuel may be selectively increased or decreased to each cylinder while the half-order frequency component of the crankcase pressure is monitored. Further, the signature, e.g. the frequency content, of each cylinder may be compared to historical engine data for the engine or to a healthy engine. For example, the diagnosis test may be performed on a healthy engine to generate a baseline signature. The baseline signature may then be compared to the frequency content while the engine is being diagnosed.

In one embodiment, the degraded cylinder may be identified by varying engine fuel injection timing. For example, advance angle adjustments may be used to diagnose the degraded cylinder. For example, engine fuel injection timing may be retarded to potentially increase blow-by and increase frequency content of the half-order frequency component. Retarding timing may increase combustion and exhaust temperatures, which may increase the speed of turbocharger 120 and the manifold air pressure. Thus, the peak firing pressure in the cylinders may be increased and blow-by may be increased.

At 825, it is determined if the degraded cylinder has been identified. If the degraded cylinder is identified, method 800 may continue at 840. If the degraded cylinder is not identified, method 800 may continue at 830. At 830, it may be reported that the potential fault is for an unknown cylinder. The report, may be via display 140 or a message transmitted with communications system 144, for example.

At 840, the identity of the potentially degraded cylinder may be reported. The report may be via display 140 or a message transmitted with communications system 144, for example.

At 845, the severity of the potential fault may be compared to a threshold value. For example, it may be more desirable to switch off the engine than to have a degraded cylinder fail in a manner that may cause additional damage to the engine. In one embodiment, a threshold value may be determined that indicates continued operation of the engine may be undesirable because the potential fault is severe. For example, the potential fault may be judged as severe if a magnitude of the half-order frequency component exceeds a threshold value. The engine may be stopped, at 850, if the severity of the potential fault exceeds the threshold value. Otherwise, method 800 may continue at 860.

At 860, a request to schedule service may be sent, such as by a message sent via communications system 144, for example. Further, by sending the potential fault condition and the severity of the potential fault, down-time of rail vehicle 106 may be reduced. For example, service may be deferred on rail vehicle 106 when the potential fault is of low severity. Down-time may be further reduced by derating power of the engine, such as by adjusting an engine operating parameter based on the diagnosed condition.

At 865, it may be determined if derating of the engine is enabled. For example, derating the power of the engine may reduce blow-by which may reduce the steady-state crankcase pressure and the magnitude of one or more components of the frequency content of the crankcase pressure. If derating is not enabled, then method 800 may end. However, if derating of the engine is enabled then method 800 may continue at 870.

At 870, an engine operating parameter may be adjusted, such as to reduce additional degradation of the degraded component, for example. In one embodiment, engine speed or power may be governed to reduce blow-by of all cylinders. In one embodiment, fuel injection may be reduced or disabled to the potentially degraded cylinder while continuing to operate the other cylinders. Thus, the engine may continue to operate and blow-by of the degraded cylinder may be reduced. In this manner, the engine may be adjusted to potentially reduce additional degradation of the engine component and to potentially reduce the likelihood of catastrophic engine failure and road failure.

In one embodiment, a test kit may be used for identifying frequency content of the crankcase pressure and diagnosing a condition of the engine based on the frequency content of the crankcase pressure. For example, a test kit may include a controller that is operable to communicate with one or more crankcase pressure sensors coupled to a crankcase and operable to sense a crankcase pressure. The controller may be further operable to transform signals from the one or more crankcase pressure sensors into a frequency content that represents pressure frequency information of the crankcase. The controller may be further operable to diagnose a condition of the engine based on the frequency content of the crankcase pressure.

In the specification and claims, reference will be made to a number of terms have the following meanings, The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

The embodiments described herein are examples of articles, systems, and methods having elements corresponding to the elements of the invention recited in the clauses. This written description may enable those of ordinary skill in the art to make and use embodiments having alternative elements that likewise correspond to the elements of the invention recited in the clauses. The scope of the invention thus includes articles, systems and methods that do not differ from the literal language of the clauses, and further includes other articles, systems and methods with insubstantial differences from the literal language of the clauses. While only certain features and embodiments have been illustrated and described herein, many modifications and changes may occur to one of ordinary skill in the relevant art. The appended clauses cover all such modifications and changes.

The invention claimed is:

1. A method for an engine including a crankcase, comprising:
    diagnosing, via an electronic controller, a condition of the engine based on frequency content of a measured crankcase pressure, wherein diagnosing the engine condition includes identifying whether there is degradation of each of a turbocharger and an engine cylinder;
    adjusting, via the electronic controller, an engine operating parameter based on the diagnosed condition; and
    correlating crankcase pressure information to one or more of a crankshaft position, a camshaft position, or a fuel injection sequence.

2. The method of claim 1, wherein diagnosing the engine condition includes determining an increased blow-by condition of degraded engine cylinder, and the condition is based at least in part on a power stroke frequency component of the frequency content of the crankcase pressure that exceeds a power stroke frequency component threshold value.

3. The method of claim 2, wherein the engine is a four stroke engine and the power stroke frequency component is half of a crankshaft revolution frequency, and diagnosing the engine condition includes identifying a magnitude of the power stroke frequency component being greater than the power stroke frequency component threshold value.

4. The method of claim 1, wherein adjusting the engine operating parameter comprises derating engine power in response to a positive identification of degradation of the engine cylinder or the turbocharger.

5. The method of claim 1, wherein adjusting the engine operating parameter comprises reducing an amount of fuel injected into the degraded engine cylinder in response to a positive identification of degradation of the engine cylinder.

6. The method of claim 1, further comprising:
    measuring an average crankcase pressure;
    comparing the measured average crankcase pressure to a first average crankcase pressure threshold value;
    determining a first order frequency component of the frequency content, the first order frequency component about a crankshaft revolution frequency;

comparing a magnitude of the first order frequency component to a first order frequency threshold value; and determining degradation of the crankcase based at least in part on whether the measured average crankcase pressure exceeds the first average crankcase pressure threshold value and the magnitude of the first order frequency component is less than the first order frequency threshold value.

7. The method of claim 1, further comprising:

measuring an average crankcase pressure, wherein the engine is a four stroke engine;

comparing the measured average crankcase pressure to an average crankcase pressure threshold value;

determining degradation of the turbocharger based at least in part on whether the measured average crankcase pressure exceeds the average crankcase pressure threshold value; and determining whether the frequency content of the crankcase pressure includes a half-order frequency component that is less than a half-order frequency component threshold value, wherein the half-order frequency component is at about half a crankshaft revolution frequency.

8. The method of claim 1, further comprising in response to a positive identification of degradation of the engine cylinder, identifying which cylinder of a plurality of cylinders of the engine is the degraded engine cylinder based on the correlating.

9. A method for an engine including a crankcase, comprising:

diagnosing, via an electronic controller, a condition of the engine based on frequency content of a measured crankcase pressure, wherein diagnosing the engine condition includes identifying whether there is degradation of each of a turbocharger and an engine cylinder;

adjusting, via the electronic controller, an engine operating parameter based on the diagnosed condition;

determining a power stroke frequency component of the frequency content; and selectively disabling fuel injection to one or more cylinders of the engine based at least in part on the power stroke frequency component.

10. A method for an engine including a crankcase, comprising:

diagnosing, via an electronic controller, a condition of the engine based on frequency content of a measured crankcase pressure, wherein diagnosing the engine condition includes identifying whether there is degradation of each of a turbocharger and an engine cylinder;

adjusting, via the electronic controller, an engine operating parameter based on the diagnosed condition, wherein diagnosing the engine condition includes determining an increased blow-by condition of degraded engine cylinder, and the condition is based at least in part on a power stroke frequency component of the frequency content of the crankcase pressure that exceeds a power stroke frequency component threshold value;

varying engine fuel injection to the engine cylinder; and monitoring for a resulting change in the frequency content caused by the fuel injection variation.

11. The method of claim 10, wherein the engine is a two stroke engine and the power stroke frequency component is about a crankshaft revolution frequency, and diagnosing the engine condition includes identifying a magnitude of the power stroke frequency component being greater than the power stroke frequency component threshold value.

12. The method of claim 10, wherein the engine is a four stroke engine and the power stroke frequency component is half of a crankshaft revolution frequency, and diagnosing the engine condition includes identifying a magnitude of the power stroke frequency component being greater than the power stroke frequency component threshold value.

13. A method for a four stroke engine including a crankcase enclosing a crankshaft, comprising:

distinguishing, via an electronic controller and based on each of an average crankcase pressure and a frequency content of the crankcase pressure, between engine degradation and turbocharger degradation, the frequency content including a half-order component substantially at half a crankshaft revolution, the distinguishing including:

comparing the average crankcase pressure to a first average crankcase pressure threshold value;

detecting a magnitude of the half-order component of the frequency content that is less than a second magnitude threshold value; and determining degradation of each of a turbocharger or a crankcase evacuation system based on the average crankcase pressure comparison and the detected magnitude; and adjusting an engine operating parameter based on the distinguished degradation.

14. The method of claim 13, wherein adjusting the engine operating parameter comprises derating engine power in response to a positive identification of degradation of an engine cylinder or the turbocharger.

15. The method of claim 13, wherein adjusting the engine operating parameter comprises reducing an amount of fuel injected into a degraded engine cylinder in response to a positive identification of degradation of an engine cylinder.

16. The method of claim 13, wherein each of the first average crankcase pressure threshold value and the second magnitude threshold value are based on one or more of engine speed, engine load, crankcase temperature, and historical engine data.

17. A method for an engine including a crankcase, comprising:

diagnosing, via an electronic controller, a condition of the engine based on frequency content of a measured crankcase pressure, wherein diagnosing the engine condition includes identifying whether there is degradation of each of a turbocharger and an engine cylinder, wherein degradation of the engine cylinder is identified based on a magnitude of a power stroke frequency component of the frequency content of the crankcase pressure exceeding a power stroke frequency component threshold value, wherein degradation of the turbocharger is identified based on an average crankcase pressure exceeding an average crankcase pressure threshold value and a magnitude of the power stroke frequency component of the frequency content of the crankcase pressure being below the power stroke frequency component threshold value, and wherein the engine is a four stroke engine and the power stroke frequency component is half of a crankshaft revolution frequency; and adjusting, via the electronic controller, an engine operating parameter based on the diagnosed condition.

18. The method of claim 17, wherein adjusting the engine operating parameter comprises derating engine power in response to a positive identification of degradation of the engine cylinder or the turbocharger.

19. The method of claim 17, wherein adjusting the engine operating parameter comprises reducing an amount of fuel injected into the degraded engine cylinder in response to a positive identification of degradation of the engine cylinder.

20. The method of claim 17, further comprising in response to a positive identification of degradation of the engine cylinder, identifying which cylinder of a plurality of cylinders of the engine is the degraded engine cylinder based on correlating time-domain crankcase pressure information to one or more of a crankshaft position, a camshaft position, and a fuel injection sequence.

* * * * *